US007089257B2

(12) United States Patent
McGrath (10) Patent No.: US 7,089,257 B2
(45) Date of Patent: Aug. 8, 2006

(54) METHOD AND SYSTEM FOR PROVIDING A UNIFIED DATA EXCHANGE AND STORAGE FORMAT

(75) Inventor: Gary G. McGrath, Carlsbad, CA (US)

(73) Assignee: Qualcomm, Inc., San Diego, CA (US)

( * ) Notice: Subject to any disclaimer, the term of this patent is extended or adjusted under 35 U.S.C. 154(b) by 788 days.

(21) Appl. No.: 09/967,406

(22) Filed: Sep. 27, 2001

(65) Prior Publication Data
US 2003/0061241 A1 Mar. 27, 2003

(51) Int. Cl.
*G06F 17/00* (2006.01)
(52) U.S. Cl. .................... 707/102; 709/230; 710/33
(58) Field of Classification Search ............ 707/102; 709/206, 230; 710/33
See application file for complete search history.

(56) References Cited

U.S. PATENT DOCUMENTS

| | | | | | |
|---|---|---|---|---|---|
| 5,073,852 | A | * | 12/1991 | Siegel et al. ............... | 719/313 |
| 5,432,841 | A | * | 7/1995 | Rimer ........................ | 455/457 |
| 5,884,032 | A | * | 3/1999 | Bateman et al. ............ | 709/204 |
| 5,907,835 | A | * | 5/1999 | Yokomizo et al. ............ | 707/1 |
| 6,009,478 | A | * | 12/1999 | Panner et al. ................. | 710/5 |
| 6,047,323 | A | * | 4/2000 | Krause ........................ | 709/227 |
| 6,134,617 | A | * | 10/2000 | Weber ......................... | 710/105 |
| 6,148,329 | A | * | 11/2000 | Meyer ......................... | 709/206 |
| 6,157,935 | A | * | 12/2000 | Tran et al. ................... | 715/503 |
| 6,175,560 | B1 | * | 1/2001 | Bhagalia et al. ............ | 370/342 |
| 6,202,060 | B1 | * | 3/2001 | Tran ............................. | 707/3 |
| 6,249,792 | B1 | * | 6/2001 | Zwilling et al. ............ | 707/205 |
| 6,286,015 | B1 | | 9/2001 | Govindarajan et al. | |
| 6,330,655 | B1 | * | 12/2001 | Vishlitzky et al. ........... | 711/208 |
| 6,336,157 | B1 | * | 1/2002 | Carbonaro et al. ........... | 710/59 |
| 6,356,951 | B1 | * | 3/2002 | Gentry, Jr. ................... | 709/250 |
| 6,424,872 | B1 | * | 7/2002 | Glanzer et al. ............... | 700/18 |
| 6,427,149 | B1 | * | 7/2002 | Rodriguez et al. ........... | 707/10 |
| 6,563,796 | B1 | * | 5/2003 | Saito .......................... | 370/252 |
| 6,591,289 | B1 | * | 7/2003 | Britton ....................... | 709/203 |
| 2001/0033581 | A1 | * | 10/2001 | Kawarai et al. ............. | 370/468 |
| 2002/0107713 | A1 | * | 8/2002 | Hawkins ....................... | 705/8 |

FOREIGN PATENT DOCUMENTS

WO 9956230 11/1999

OTHER PUBLICATIONS

"Universal Data Option for Informix Dynamic Server", INFORMIX 1998, XP002128177; URL:http://www.informix.cim/informix/tech/briefs/udo/udo.pdf retrieved on Jan. 19, 2000.

\* cited by examiner

*Primary Examiner*—Wayne Amsbury
(74) *Attorney, Agent, or Firm*—Philip Wadsworth; Sandra L. Godsey; Abdollah Katbab (57) ABSTRACT

A method and system is presented that provides for a unified format for both data exchange and data storage protocols in a network. The unified data format provides for an efficient protocol for receiving, parsing, decoding, and storing varying sizes of real-time data.

39 Claims, 8 Drawing Sheets

| FIELD | BITS | R/O | DESCRIPTION |
|---|---|---|---|
| 302 OVERALL_FORMAT_ID | 4 X 8 | req | "GBRF" |
| 304 OVERALL_FORMAT_VERSION | 8 | req | 0x00 |
| 306 RECORD_FORMAT_TYPE | 4 X 8 | req | 'BDEF' |
| 308 FORMAT_VERSION | 16 | req | 0x0002 |
| 310 OVERALL_FORMAT_OPTIONS | 16 | req | Describes format options (B0 is LSB, 1=TRUE): (B0) CRC present (B1) Record wrapping (B2-B15) Reserved |
| 312 EOR_SENTINEL | 16 | req | 0xFACE |
| 314 EOS_SENTINEL | 16 | req | 0xDEAD |
| 316 TOTAL_RECORDS_SIZE | 32 | opt | If the Record Wrapping flag is set in FORMAT, then this is the total size in bytes of record data including holes caused by wrapping. |
| 318 FIRST_RECORD_BYTE | 32 | opt | If the Record Wrapping flag is set in FORMAT, then this is the offset from the beginning of the stream to the first byte of the first RECORD. |
| 320 LAST_RECORD_BYTE | 32 | opt | If the Record Wrapping flag is set in FORMAT, then this is the offset from the beginning of the stream to the last byte of the last RECORD, which should be its END_OF_RECORD sentinel. |
| 322 END_OF_HEADER | 16 | req | 0xC0DE |
| 324 RECORD[0] | Variable | opt | A single record |
| 326 RECORD[1] | Variable | opt | |
| 328 ... | | | |
| 330 RECORD[N-1] | Variable | opt | |
| 332 0x00 ... 0x00 | Variable | opt | Optional dead space caused by wrapping. |
| 334 CRC | 16 | opt | 16-bit CITT CRC applied to RECORD[0] - RECORD[N-1] in time order (if wrapped) and seeded with 0xFFFF. |
| 336 END_OF_STREAM | 16 | req | 0xDEAD |

| | FIELD | BITS | R/O | DESCRIPTION |
|---|---|---|---|---|
| 302 | OVERALL_FORMAT_ID | 4 X 8 | req | "GBRF" |
| 304 | OVERALL_FORMAT_VERSION | 8 | req | 0x00 |
| 306 | RECORD_FORMAT_TYPE | 4 X 8 | req | 'BDEF' |
| 308 | FORMAT_VERSION | 16 | req | 0x0002 |
| 310 | OVERALL_FORMAT_OPTIONS | 16 | req | Describes format options (B0 is LSB, 1=TRUE):<br>(B0) CRC present<br>(B1) Record wrapping<br>(B2-B15) Reserved |
| 312 | EOR_SENTINEL | 16 | req | 0xFACE |
| 314 | EOS_SENTINEL | 16 | req | 0xDEAD |
| 316 | TOTAL_RECORDS_SIZE | 32 | opt | If the Record Wrapping flag is set in FORMAT, then this is the total size in bytes of record data including holes caused by wrapping. |
| 318 | FIRST_RECORD_BYTE | 32 | opt | If the Record Wrapping flag is set in FORMAT, then this is the offset from the beginning of the stream to the first byte of the first RECORD. |
| 320 | LAST_RECORD_BYTE | 32 | opt | If the Record Wrapping flag is set in FORMAT, then this is the offset from the beginning of the stream to the last byte of the last RECORD, which should be its END_OF_RECORD sentinel. |
| 322 | END_OF_HEADER | 16 | req | 0xC0DE |
| 324 | RECORD[0] | Variable | opt | A single record |
| 326 | RECORD[1] | Variable | opt | |
| 328 | ... | | | |
| 330 | RECORD[N-1] | Variable | opt | |
| 332 | 0x00 ... 0x00 | Variable | opt | Optional dead space caused by wrapping. |
| 334 | CRC | 16 | opt | 16-bit CITT CRC applied to RECORD[0] – RECORD[N-1] in time order (if wrapped) and seeded with 0xFFFF. |
| 336 | END_OF_STREAM | 16 | req | 0xDEAD |

FIG. 3

| FIELD | BITS | R/O | DESCRIPTION |
| --- | --- | --- | --- |
| REC_SIZE_SIZE | 2 | req | Size of REC_SIZE (i.e. 0=6, 1=14, 2=22, 3=30). |
| REC_SIZE | 6/14/22/30 | req | Size of record in bytes including all required and optional fields (e.g. FORMAT, TYPE, CRC, etc) except REC_SIZE_SIZE and REC_SIZE itself. |
| REC_FORMAT | 1 | req | CRC present |
| REC_TYPE_SIZE | 1 | req | Size of REC_TYPE (i.e. 0=6, 1=14). |
| REC_TYPE | 6/14 | req | 0x00-0x3FFE – See Figure 13. 0x3FFF – Reserved by GBRF |
| DATA_OPTIONS | 5 | req | Describes format options (B0 is LSB, 1=TRUE): (B0) Synchronous array of records (number and period). Requires B2==0. (B1) DATA_AT_IP present (B2) Asynchronous array of records (number and delta times). Requires B0==0. (B3) DATA_PN present (B4) Reserved (set to 0) |
| DATA_TIME_STAMP | 43 | req | HDR time in 5/3 milliseconds |
| DATA_CARD_IP | 32 | req | |
| DATA_AT_IP | 32 | opt | The AT address MUST be logged for all data that is particular to one AT, except in the AT itself, which may just write the DATA_CARD_IP field. |
| DATA_PN | 16 | opt | The PN address MUST be logged for all data that is particular to one sector. |

FIG. 4A

| FIELD | BITS | R/O | DESCRIPTION |
|---|---|---|---|
| DATA_ARRAY_NUMBER | 16 | opt | This is required if ((DATA_OPTIONS.B0 == 1) \|\| (DATA_OPTIONS.B2 == 1)) |
| DATA_ARRAY_PERIOD | 32 | opt | HDR time in 5/3 milliseconds. This is required if ((DATA_OPTIONS.B0 == 1) && (DATA_OPTIONS.B2 != 1)) |
| DATA_TIME_DELTA_SIZE [0] | 2 | opt | Size of following DATA_TIME_DELTA (0=6, 1=14, 2=22, 3=30). |
| DATA_TIME_DELTA[0] | 6/14/22/30 | opt | Time difference between this value's DATA_TIME_STAMP. |
| ... | | | |
| DATA_TIME_DELTA_SIZE [N-1] | 2 | opt | Size of following DATA_TIME_DELTA (0=6, 1=14, 2=22, 3=30). |
| DATA_TIME_DELTA[N-1] | 6/14/22/30 | opt | Time difference between this value and the previous value. |
| DATA_BODY[0] | Variable | opt | Record contents |
| ... | | | |
| DATA_BODY[N-1] | Variable | opt | |
| PADDING | Variable | opt | If DATA_BODY is a BITS value, then this padding will fill up to the end of the byte. |
| REC_CRC | 16 | opt | 16-bit CITT CRC applied to BODY and seeded with 0xFFFF. |
| END_OF_RECORD | 16 | req | 0xFACE |

FIG. 4B

| BYTE NUMBERS | 0 | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|---|
| HEADER BYTES | 47 | 42 | 52 | 46 | 00 | 42 | 44 | 45 | 46 | 00 | 02 | 00 | 00 | FA | CE | DE | AD | CO | DE |
| DESCRIPTION | G | B | R | F | 0 | B | D | E | F | 0 | 2 | 0 | 0 | FACE | | DEAD | | CODE | |
| REFERENCE TO FIG. 3 | 302 | | | | 304 | 306 | | | | 308 | | 310 | | 312 | | 314 | | 322 | |

FIG. 5

| BYTE NUMBERS | 0 | 1 | 2 | 3 | 4 | 5 | 6 | 7 | 8 | 9 | 10 | 11 | 12 | 13 | 14 | 15 | 16 | 17 | 18 | 19 | 20 | 21 |
|---|---|---|---|---|---|---|---|---|---|---|---|---|---|---|---|---|---|---|---|---|---|---|
| HEADER BYTES | 15 | 02 | 11 | 23 | 45 | 67 | 89 | AB | AB | CD | EF | 01 | 12 | 34 | 56 | 78 | 30 | 31 | 32 | 33 | FA | CE |
| DESCRIPTION | | | | | | | | | | | | | | | | | | | | | FACE | |
| REFERENCE TO FIG. 4 | | | | 414 | | | | | 416 | | | | 418 | | | | | | | | 444 | |

| HEADER BITS | 0 | 0 | 0 | 1 | 0 | 1 | 0 | 1 | 0 | 0 | 0 | 0 | 0 | 0 | 0 | 1 |
|---|---|---|---|---|---|---|---|---|---|---|---|---|---|---|---|---|
| DESCRIPTION | 0 | | | 21 | | | | | 0 | | 0 | | | | 2 | |
| REFERENCE TO FIG. 4 | 402 | | | 404 | | | | | 406 | | 408 | | | | 410 | |

METHOD AND SYSTEM FOR PROVIDING A UNIFIED DATA EXCHANGE AND STORAGE FORMAT

BACKGROUND

1. Field

The present disclosed embodiments relate generally to communication systems, and more specifically to a method and system that provides a unified format for data exchange and data storage protocols.

2. Background

Existing formats for data exchange in a network largely differ from existing formats for data storage; therefore, data received by a data client has to be reformatted before being stored. Existing data exchange formats and disk storage formats are optimized for either small or large data sizes, but not both. Current data storage formats lack the features necessary to make them useful for exchanging real-time, size-varying data robustly over network connections, and current network protocols lack the features necessary for robustly storing data.

There is, therefore, a need in the art for a unified format that is suitable for both data exchange and storage so that the unified format would result in cost-effective implementation, compatibility with other tools, and code-reusability. There is also a need for a unified data exchange and storage format for efficient data compression/decompression to reduce hardware and/or software runtime costs.

SUMMARY

The embodiments disclosed herein address the above-stated needs by providing a method and system for formatting data in a network including a data client and a data manager. The method and system provide a unified data format that has a header section, a records section, and a tail section, such that the data format is applicable for both data exchange and data storage.

In another aspect of the invention, a data client apparatus includes a receiver configured to receive data from a data manager over a network connection and a transmitter configured to send the data to a storage unit, such that the data received over the network connection and the data sent to the storage unit have the same format.

In another aspect of the invention, a data structure for formatting data in a network includes a header section, a records section, and a tail section such that the data structure is applicable for both data exchange and data storage protocols.

DETAILED DESCRIPTION

Figure 1:
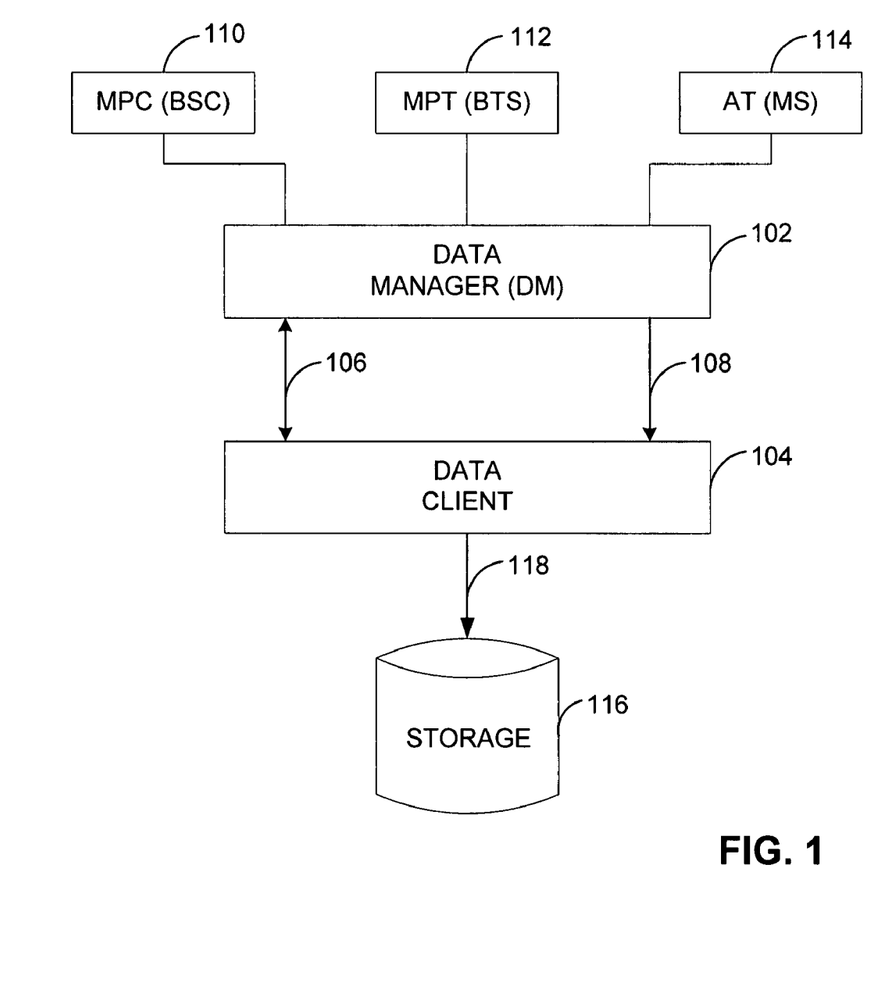
FIG. 1 shows a representation of an exemplary network interface for implementing data exchange protocols.

FIG. 1 shows a representation of an exemplary network interface between a data manager 102 and a data client 104, through connections 106 and 108. Data manager 102 may include a network element such as a Web server or an access network (AN). Data manager 102 may be in data communication with data sources such as a modem pool controller (MPC) 110, a modem pool transceiver (MPT) 112, and/or an access terminal (AT) 114. Data client 104 may include a client terminal such as a personal computer, a high data rate (HDR) analysis tool (HAT), or another data server incorporating data from data manager 102 into its own data.

In one embodiment, data communication between data manager 102 and data client 104 may be controlled by two protocols: data manager protocol (DMP) for data control, and binary data exchange format (BDEF) for data delivery and storage. The DMP protocol may include data manager control protocol (DMCP) and data manager discovery protocol (DMDP), as discussed in detail in the co-pending U.S. patent application Ser. No. 09/966,243.

Data Manager Protocol

The DMP protocol is designed for easy implementation and debugging. The design goals include having the commands atomic and the server connections stateless. An instruction does several things "atomically" when all the things are done immediately, and there is no chance of the instruction being half-completed, being interspersed, or being interrupted. A stateless server treats each request as an independent transaction, unrelated to any previous request. This simplifies the server design because it does not need to allocate storage to deal with conversations in progress or worry about freeing the storage if a client dies in the middle of a transaction. The commands and responses may be in American standard code for information interchange (ASCII), and their format is chosen to make machine parsing easy to implement.

Data Manager Control Protocol (DMCP)

Data manager 102 may support DMCP protocol for sending and receiving DMCP commands, through two-way connection 106, for example. The two-way connection 106 may include trasmissiom control protocol (TCP) or user datagram protocol (UDP) connections. Data manager 102 may use TCP connection for DMCP commands on port 1880. However, if data manager 102 supports DMDP protocol, as defined in the above-referenced co-pending Patent Application, it may also support DMCP protocol on other ports.

Binary Data Exchange Format (BDEF)

A unified data exchange and storage format advantageously results in efficient implementations, compatibility to other network components, and code reusability. Such data format is suitable for large volumes of data of varying sizes that may come in real-time. FIG. 1 shows an exemplary network where the data exchanged over the network connection 108 and the data stored in the storage unit 116 have a unified format, e.g., BDEF. Data client 104 may receive data from data manager 102 over network connection 108 and send the data to storage unit 116 over connection 118. In one embodiment, the data exchange format over network connection 108 and the data storage format in storage unit 116 are unified.

In one embodiment, such a unified format may include an overall format and a record format. The overall format may be viewed as both a file format, which may define a data storage format, and a network format, which may define a data exchange format across a network.

Figure 2:
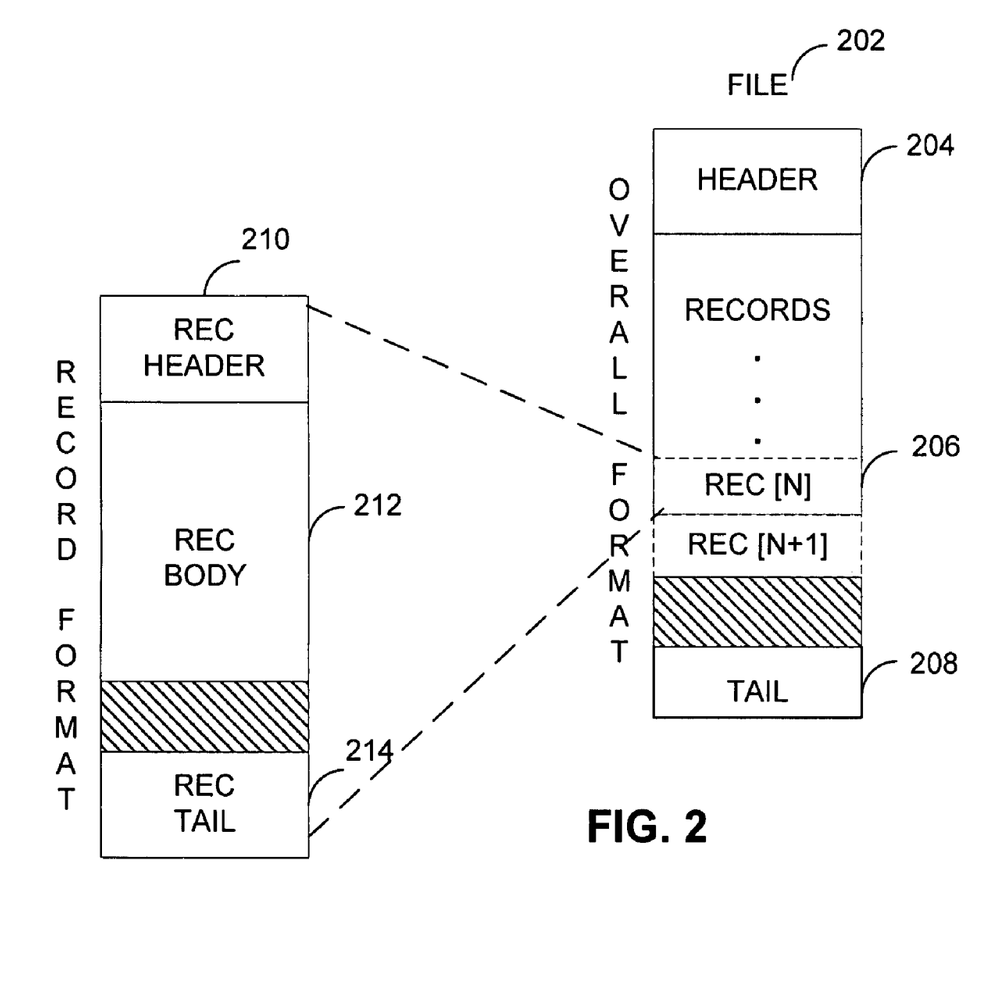
FIG. 2 shows a representation of an exemplary data format.

FIG. 2 shows an exemplary data structure for a unified data format, according to one embodiment. The overall format of a file 202 may include a header section 204, a records section 206, and a tail section 208. In one embodiment, the overall format 202 may have only a records section. The record format of a record within the records section 206 may also include a record header 210, a record body 212, and a record tail 214.

Figure 3:
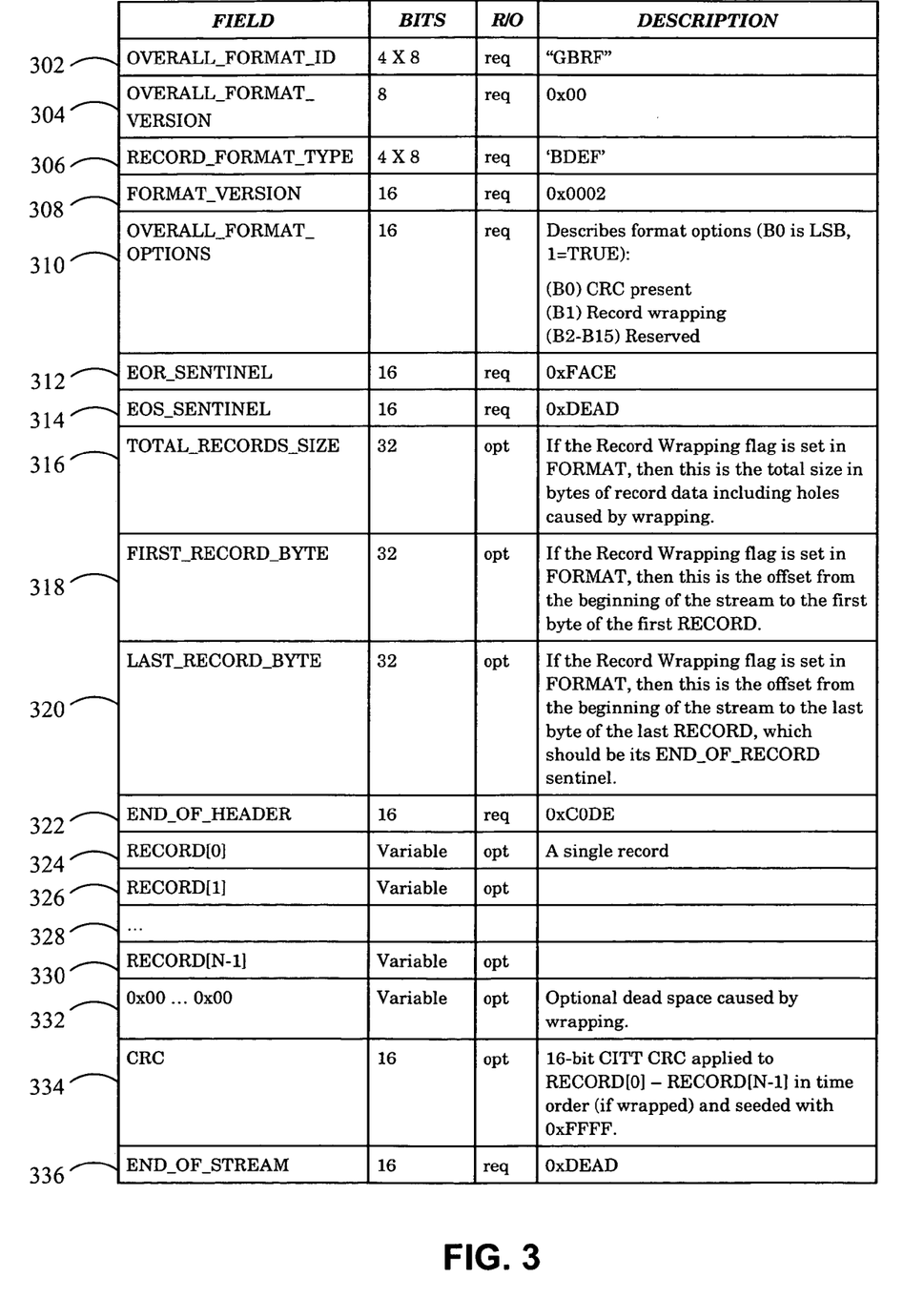
FIG. 3 shows a representation of an exemplary overall data format.

FIG. 3 shows an exemplary detailed overall format for BDEF format. Rows 302 to 322 correspond to the header section 204, rows 324 to 332 correspond to the records section 206, and rows 334 to 336 correspond to the tail section 208. Some of these rows are described below:

OVERALL_FORMAT_ID 302 identifies the basic overall format. In one embodiment, the basic overall format is generic binary record format (GBRF). Any file viewer or editor may be used to examine the first four bytes of a file, or the OVERALL_FORMAT_ID 302, to determine the basic overall format, e.g., GBRF. As shown in FIG. 3, if the file is a GBRF-formatted file, the corresponding ID value should be set to the ASCII characters for GBRF.

OVERALL_FORMAT_VERSION 304 specifies what version of the basic overall format, e.g., GBRF, the file is based on.

RECORD_FORMAT_TYPE 306 and the RECORD_FORMAT_VERSION 308 specify the record format type, e.g., BDEF, and its version, e.g., 2, respectively. The prefix "0x" in "0x0002" indicates the hexadecimal representation of 2.

OVERALL_FORMAT_OPTIONS 310 specify format options. In one embodiment, two of the 16 bits may specify optional fields, and the other bits may be reserved, i.e., set to 0, for future format options.

EOR_SENTINEL 312 and EOS_SENTINEL 314 fields specify what sentinel values are used for the end of records and end of streams, respectively. EOR_SENTINEL 312 indicates end of a record, and EOS_SENTINEL 314 indicates end of an overall format. These values may be not fixed so that the GBRF-formatted files may be easily embedded into the records of other GBRF-formatted files, thereby providing for a recursive file structure.

TOTAL_RECORDS_SIZE 316, FIRST_RECORD_BYTE 318, and LAST_RECORD_BYTE 320 fields may be used for streams where the records are not in byte order, but are wrapped. Record wrapping is useful in situations where records are buffered locally in a fixed-sized buffer and a larger amount of data than the buffer size is likely. Therefore, the wrapped records just keep the latest records that will fit into the file, e.g. FIFO queue.

END_OF_HEADER 322 may be used as simple data integrity check after parsers have parsed the header information.

CRC field 334 at the end of the stream provides an application-level data integrity check. If the file is wrapped, then the CRC is calculated in time order. Data parsers may have to support this feature, but application writers may have the option of not implementing it.

END_OF_STREAM 336 provides another data integrity check. It may be used for checking non-reliable transports, for determining the end in real-time transports, and for data integrity checking in the GBRF recursive format.

EXAMPLE 1

Figure 5:
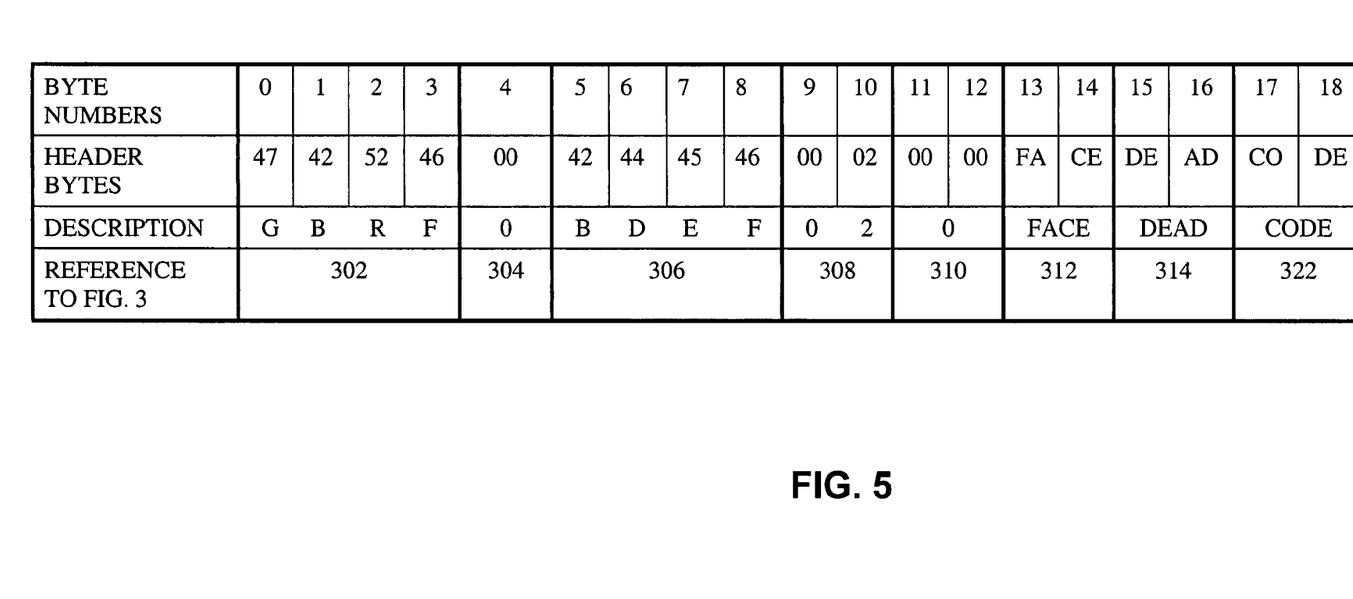
FIG. 5 shows a representation of an exemplary header for an overall data format.

The following example shows a header with no options, which requires 19 hexadecimal bytes to implement, e.g., "47 42 52 46 00 42 44 45 46 00 02 00 00 FA CE DE AD C0 DE."

Referring to FIG. 5, the constituent bytes are defined as:

bytes 0 to 3 define OVERALL_FORMAT_ID 302, e.g., GBRF byte 4 defines OVERALL_FORMAT_VERSION 304 bytes 5 to 8 define RECORD_FORMAT_TYPE 306, e.g., BDEF bytes 9 to 10 define RECORD_FORMAT_VERSION 308 bytes 11 to 12 define OVERALL_FORMAT_OPTIONS 310, e.g., no options bytes 13 to 14 and 15 to 16 define EOR_SENTINEL 312 and the EOS_SENTINEL 314, respectively bytes 17 to 18 define END_OF_HEADER 322

The same header but with the CRC option enabled requires also 19 hexadecimal bytes, e.g., "47 42 52 46 00 42 44 45 46 00 02 00 01 FA CE DE AD C0 DE," where bytes 11–12 define OVERALL_FORMAT_OPTION 310, e.g., B0=1, meaning that CRC is present. A trailer with no CRC option may require two hexadecimal bytes "DE AD."

Figure 4A:
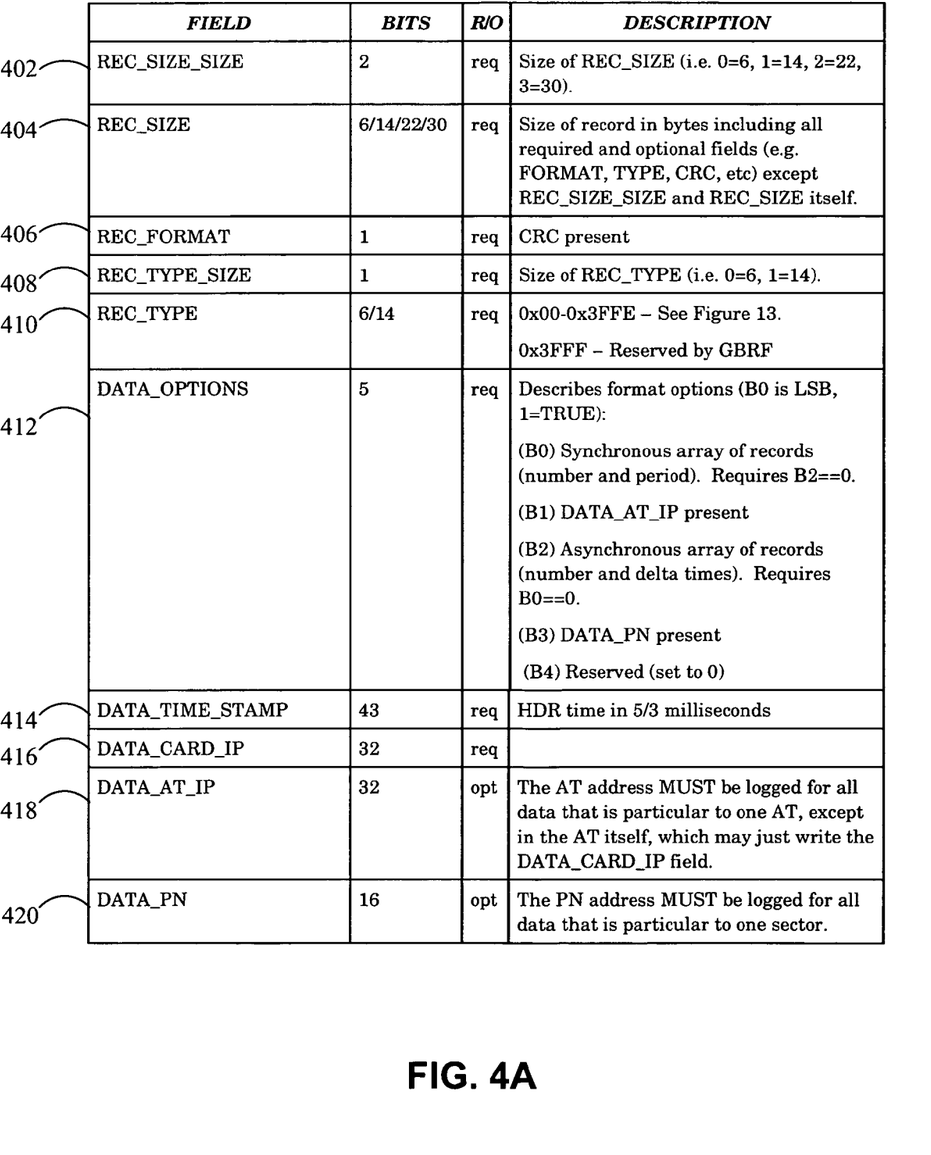
FIGS. 4A and 4B show a representation of an exemplary record format.
Figure 4B:
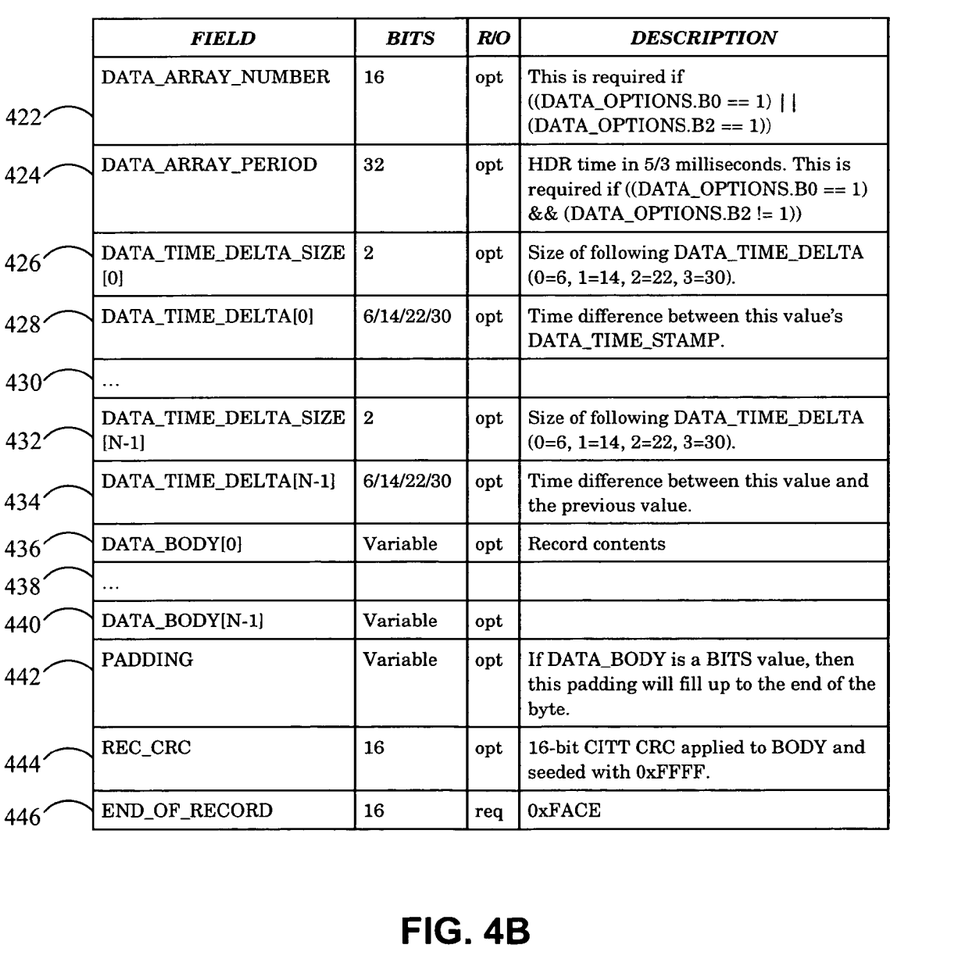

FIGS. 4A and 4B show an exemplary BDEF record format, according to one embodiment. Rows 402 to 434 correspond to the record header 210, rows 436 to 440 correspond to the record body 212, and rows 444 to 446 correspond to the record tail 214. Some of these fields are described below.

REC_SIZE_SIZE 402, which greatly simplifies implementation, provides the number of bits that are allocated for REC_SIZE 404. A data parser may quickly read one byte to determine how many bytes are needed to complete the REC_SIZE 404. Once the parser reads the entire REC_SIZE 404 and decodes it, the parser allocates memory efficiently.

Using REC_SIZE_SIZE 402 facilitates skipping a record. Applications that write records may already know the data size, so writing records is also made simple. However, an application writer may not need to worry about REC_SIZE_SIZE field 402 when writing variable REC_SIZE data, if the record writer hard-codes the upper 2 bits of a 32-bit word and uses the 30-bit word size even for small values. Therefore, the record format disclosed herein is optimally flexible, and may not require extra implementation costs.

END_OF_RECORD 446 may also be specified in the overall format header field EOR_SENTINEL 312 (FIG. 3), which the record writer may use.

Both data managers (producers) and the data clients (consumers) may know the definitions for different record BODY fields a priori, because they may be defined and mapped to a certain REC_TYPE value. BODY definitions may also be determined by some protocol or from stored special record. However, a RECORD_TYPE value that is not explicitly known to the data consumer may be treated as if the BODY definition was an integer word field with however many bits available to the BODY field. By having the unknown RECORD_TYPE values treated as arbitrary sized words, the data producers may quickly define and implement new data types such that they work automatically with existing data consumers.

In one embodiment, the BDEF streams may contain a data type summary record as the first record, thus saving the pairing of REC_TYPE values to attributes names and definitions, which may change over time.

EXAMPLE 2

Figure 6:
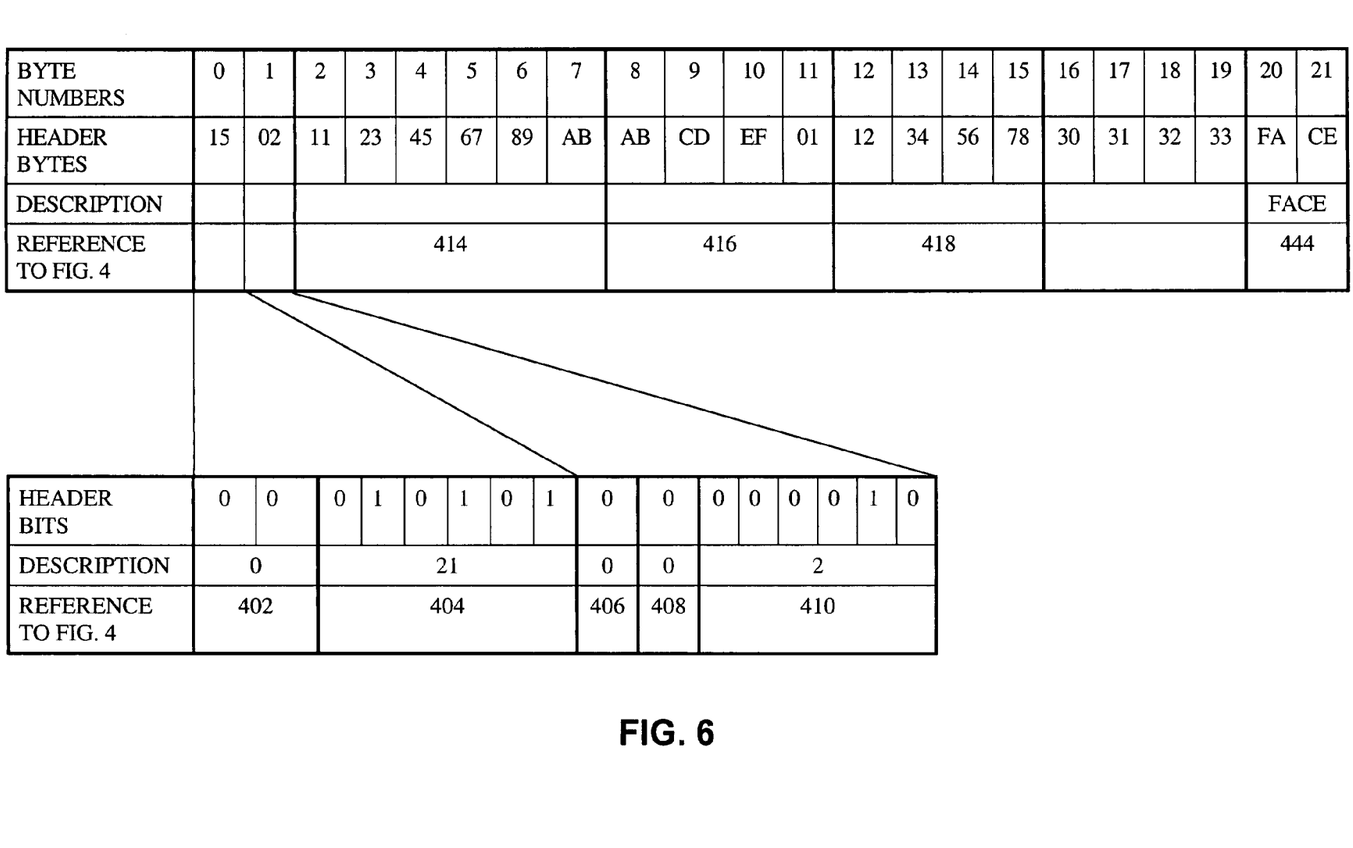
FIG. 6 shows a representation of an exemplary record format.

In an exemplary embodiment, for TIME=0x123456789AB, CARD_IP=0XABCDEF01, defining data source, AT_IP=0x12345678, defining data target, REC_TYPE=0x2, and 4-byte BODY consisting of the characters 0, 1, 2, and 3, the record format may require 22 hexadecimal bytes, e.g., "15 02 11 23 45 67 89AB AB CD EF 01 12 34 56 78 30 31 32 33 FA CE."

Referring to FIG. 6, the constituent bytes and/or bits are described below:

the first two bits of the byte 0, define REC-SIZE-SIZE 402, e.g. 0 the last six bits of byte 0 define REC-SIZE 404, e.g. 6, indicating that 21 bytes are required to define the rest of record format the first bit of byte 1 defines REC-FORMAT 406, e.g. 6 the second bit of byte 1 defines REC_TYPE_SIZE 408, e.g., 0, indicating 6 bytes are required to define REC_TYPE 410 the last six bits of byte 1 define REC-TYPE 410, e.g. 2 bytes 2–7 define DATA_TIME_STAMP 414 bytes 8–11 define DATA_CARD_IP 416, defining data source IP address bytes 12–15 define DATA_AT_IP 418, defining data target IP address bytes 16–19 define data characters bytes 20–21 define END_OF_RECORD 446

Figure 7:
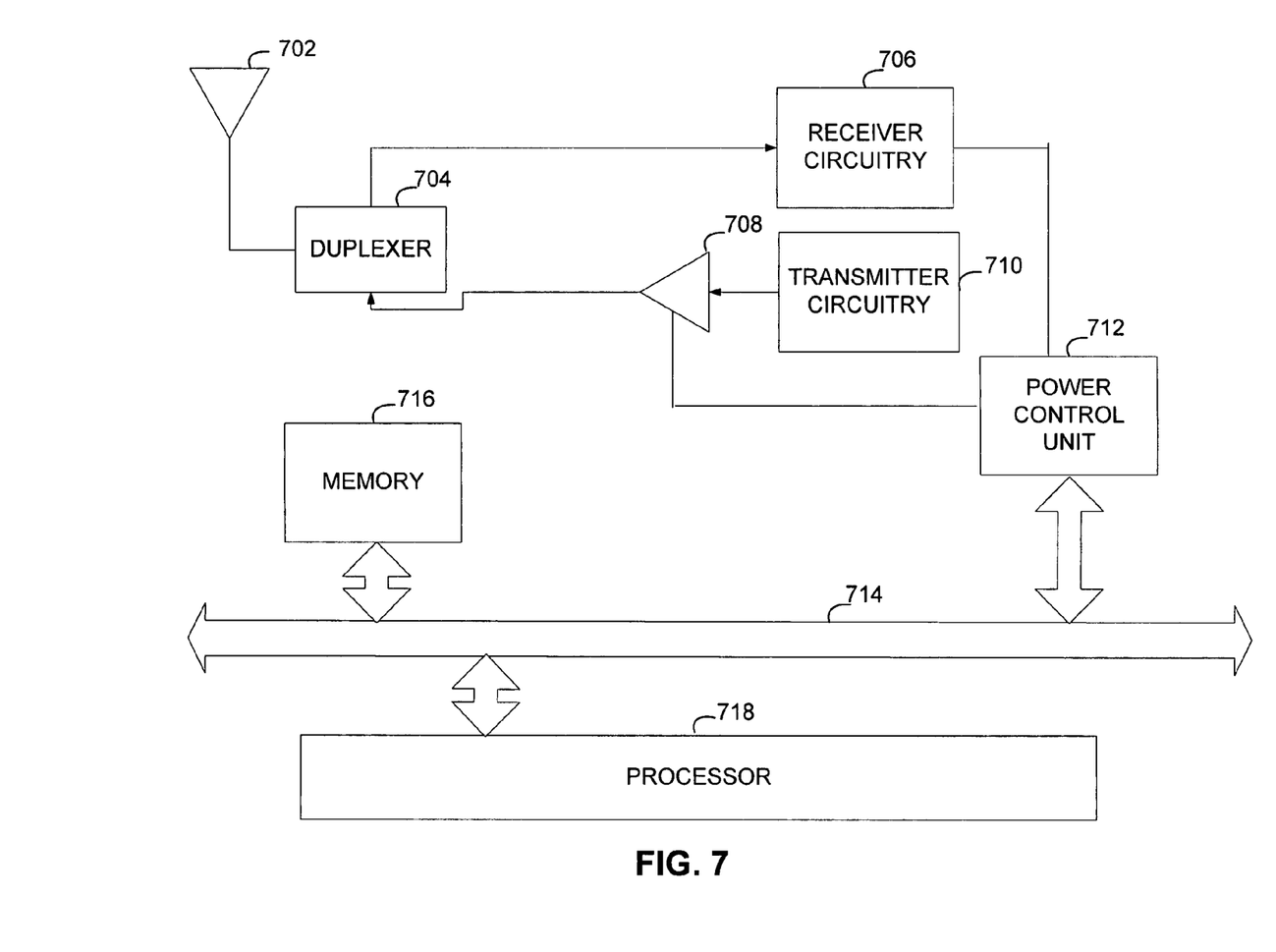
FIG. 7 shows a block-diagram representation of an exemplary embodiment for the data client and data manger operating in FIG. 1.

An exemplary embodiment for data client 104, such as a cell phone or a personal digital assistant (PDA), or for data manger 102 operating in system of FIG. 1 is illustrated in FIG. 7. The system in FIG. 7 includes antenna 702 for transmitting and receiving data. Antenna 702 is coupled to duplexer 704 for isolating the receiver path from the transmitter path. The duplexer 704 is coupled to receiver circuitry 706, forming the receiver path, and is coupled to amplifier 708 and transmit circuitry 710, forming the transmitter path. Amplifier 708 is further coupled to power control adjust unit 712 that controls amplifier 708. Amplifier 708 receives the transmission signals from transmit circuitry 710. Received signals via antenna 702 are provided to power control unit 712, which may implement a closed loop power control scheme. Power control unit 712 is coupled to communication bus 714. Communication bus 714 provides a common connection among other modules in FIG. 7. Communication bus 714 is further coupled to memory unit 716. Memory 716 stores computer readable instructions for a variety of operations and functions applicable to data client 104 or data manager 102. The processor 718 performs the instructions stored in memory unit 716.

The word "exemplary" is used exclusively herein to mean "serving as an example, instance, or illustration." Any embodiment described herein as "exemplary" is not necessarily to be construed as preferred or advantageous over other embodiments.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The invention claimed is:

1. An apparatus for exchanging data in a network, comprising:

a receiver configured to receive data from a data producer over a network connection in accordance with a data exchange protocol;

an antenna operably connected to said receiver; and a transmitter operably connected to said antenna configured to send the data to a storage unit in accordance with a data storage protocol, wherein the data received over the network connection and the data stored in the storage unit is contained in a data structure having a unified data format including a plurality of fields for complying with both the data exchange protocol and the data storage protocol, wherein said unified data format comprises an overall format and a record format.

2. The apparatus of claim 1 wherein the overall format includes a records section.

3. The apparatus of claim 1 wherein the overall format includes a header section, a records section, and a tail section.

4. The apparatus of claim 3 wherein a record in the records section includes a record format comprising a record header, a record body, and a record tail.

5. The apparatus of claim 1 wherein the network includes a wireless network.

6. The apparatus of claim 1 wherein the network includes an optical network.

7. A method for formatting data in a network, comprising:
providing a unified data format comprising an overall format and a record format,
providing a header section for said overall format, the header section including one or more fields identifying a format of one or more records contained in the data structure;
providing a records section for said overall format, the records section including the one or more records; and
providing a tail section for said overall format, the tail section including one or more fields for holding data integrity check information,
such that said overall format may be used for both data exchange and data storage.

8. The method of claim 7 further comprising providing a record in the records section comprising a record header, a record body, and a record tail.

9. The method of claim 7 further comprising providing information identifying a version for data in said overall format.

10. The method of claim 7 further comprising providing information identifying a size for the records section.

11. The method of claim 10 further comprising providing an indication of the number of bits allocated for the information identifying a size for the records section.

12. The method of claim 7 further comprising providing information identifying a record-format version.

13. The method of claim 7 further comprising providing information identifying whether an optional field in said overall format is used.

14. The method of claim 7 further comprising providing information identifying the end of data in said overall format.

15. The method of claim 7 further comprising providing information identifying the first record in the records section.

16. The method of claim 7 further comprising providing information identifying the last record in the records section.

17. The method of claim 7 further comprising providing information identifying the end of the header section.

18. The method of claim 7 further comprising providing information about a cyclic redundancy check (CRC) value.

19. The method of claim 7 further comprising providing information identifying a size of a record in the records section.

20. The method of claim 7 further comprising providing a size of a record in the records section.

21. The method of claim 7 further comprising providing information identifying a format for a record in the records section.

22. The method of claim 7 further comprising providing information identifying a size of a record type in the records section.

23. The method of claim 22 further comprising providing a record type of a record in the records section.

24. The method of claim 7 further comprising providing, in the header section, information identifying a format for data in said overall format.

25. The method of claim 7 further comprising providing a time stamp for data in said overall format.

26. The method of claim 7 further comprising providing information identifying a source of a data subsystem in the network.

27. The method of claim 7 further comprising providing information identifying a target for a data access terminal in the network.

28. The method of claim 7 further comprising providing information identifying a sector in a subsystem in the network.

29. The method of claim 7 further comprising providing information identifying a cyclic redundancy check (CRC) value for a record in the records section.

30. The method of claim 7 further comprising providing information identifying an end of a record in the records section.

31. An apparatus for formatting data in a network, comprising:
means for providing a unified data format comprising an overall format and a record format;
means for providing a header section in said overall format, the header section including one or more fields identifying a format of one or more records contained in the data structure;
means for providing a records section in said overall format, the records section including the one or more record; and
means for providing a tail section in said overall format, the tail section including one or more fields for holding data integrity check information,
such that said overall format may be used for both data exchange and data storage.

32. A computer readable medium containing instructions for a method for formatting a data in a network, the method comprising:
providing a unified data format comprising an overall format and a record format;
providing a header section in said overall format, the header section including one or more fields identifying a format of one or more records contained in the data structure;
providing a records section in said overall format, the records section including the one or more record; and
providing a tail section in said overall format, the tail section including one or more fields for holding data integrity check information, such that said overall format may be used for both data exchange and data storage.

33. An apparatus for formatting data in a network, comprising:
a memory unit;
a digital signal processor (DSP) unit communicatively coupled to the memory unit, the DSP unit being capable of:
providing a unified data format comprising an overall format and a record format;

providing a header section in said overall format, the header section including one or more fields identifying a format of one or more records contained in the data structure;

providing a records section in said overall format, the records section including the one or more record; and providing a tail section in said overall format, the tail section including one or more fields for holding data integrity check information, such that said overall format, may be used for both data exchange and data storage.

34. A method for processing data in a network including a data client and a data manager, comprising:

receiving, at the data client, data from the data manager over a network connection in accordance with a data exchange protocol; and storing the data in a storage unit in accordance with a data storage protocol, wherein the data received over the network connection and the data stored in the storage unit is contained in a data structure having a unified data format including a plurality of fields for complying with both the data exchange protocol and the data storage protocol, wherein said unified data format comprises an overall format and a record format.

35. A computer readable medium containing instructions for a method for processing data in a network including a data client and a data manager, the method comprising:

receiving, at the data client, data from the data manager over a network connection in accordance with a data exchange protocol; and storing the data in a storage unit in accordance with a data storage protocol, wherein the data received over the network connection and the data stored in the storage unit is contained in a data structure having a unified data format including a plurality of fields for complying with both the data exchange protocol and the data storage protocol, wherein said unified data format comprises an overall format and a record format.

36. An apparatus for processing data in a network of data processing systems including a data client and a data manager, comprising:

means for receiving, at the data client, data from the data manager over a network connection in accordance with a data exchange protocol; and means for storing the data in a storage unit in accordance with a data storage protocol, wherein the data received over the network connection and the data stored in the storage unit is contained in a data structure having a unified data format including a plurality of fields for complying with both the data exchange protocol and the data storage protocol, wherein said unified data format comprises an overall format and a record format.

37. An apparatus for processing data in a network including a data client and a data manager, comprising:

a memory unit; and a digital signal processor (DSP) unit communicatively coupled to the memory unit, the DSP unit being capable of:

receiving, at the data client, data from the data manager over a network connection in accordance with a data exchange protocol; and storing the data in a storage unit in accordance with a data storage protocol, wherein the data received over the network connection and the data stored in the storage unit is contained in a data structure having a unified data format including a plurality of fields for complying with both the data exchange protocol and the data storage protocol, wherein said unified data format comprises an overall format and a record format.

38. A data structure residing in memory for formatting data in a network, the data structure comprising:

a unified data format comprising an overall format and a record format;

a header section for said overall format, the header section including one or more fields identifying a format of one or more records contained in the data structure;

a records section for said overall format, the records section including the one or more record; and a tail section for said overall format, the tail section including one or more fields for holding data integrity check information, such that the data structure may be used for both data exchange and data storage.

39. The data structure of claim 38 further including a record header, a record body, and a record tail for the records section.

* * * * *